US011373342B2

(12) United States Patent
Stafford et al.

(10) Patent No.: US 11,373,342 B2
(45) Date of Patent: Jun. 28, 2022

(54) SOCIAL AND SCENE TARGET AWARENESS AND ADAPTATION OF AN OCCLUSION SYSTEM FOR INCREASED SOCIAL AND SCENE INTERACTION IN AN OPTICAL SEE-THROUGH AUGMENTED REALITY HEAD MOUNTED DISPLAY

(71) Applicant: Sony Interactive Entertainment Inc., Tokyo (JP)

(72) Inventors: Jeffrey R. Stafford, San Mateo, CA (US); Yutaka Yokokawa, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/742,046

(22) Filed: Jan. 14, 2020

(65) Prior Publication Data

US 2021/0217211 A1   Jul. 15, 2021

(51) Int. Cl.
*G06T 11/00* (2006.01)
*G02B 27/01* (2006.01)
*G06F 3/01* (2006.01)

(52) U.S. Cl.
CPC ........ *G06T 11/001* (2013.01); *G02B 27/0172* (2013.01); *G06F 3/013* (2013.01); *G06T 11/00* (2013.01); *G02B 2027/0118* (2013.01); *G02B 2027/0138* (2013.01)

(58) Field of Classification Search
CPC ............................ G06T 11/001; G06T 19/006
USPC ................................................... 345/592, 633
See application file for complete search history.

(56) References Cited

U.S. PATENT DOCUMENTS

| 2013/0293580 | A1* | 11/2013 | Spivack | G06Q 30/0623 345/633 |
|---|---|---|---|---|
| 2013/0326364 | A1* | 12/2013 | Latta | G02B 27/017 715/751 |
| 2017/0162177 | A1* | 6/2017 | Lebeck | G06F 21/6218 |
| 2017/0236332 | A1* | 8/2017 | Kipman | G06F 3/016 345/633 |
| 2018/0211448 | A1* | 7/2018 | Bar-Zeev | G09G 3/2003 |
| 2019/0026936 | A1* | 1/2019 | Gorur Sheshagiri | G06F 3/0304 |

* cited by examiner

*Primary Examiner* — Shivang I Patel
(74) *Attorney, Agent, or Firm* — John L. Rogitz (57) ABSTRACT

To improve the social interaction and interaction with external objects for a user wearing an AR head-mounted display (HMD), cameras on the HMD detect that other users ("social targets") are looking at and/or speaking to the user. The region around the social target in the AR user's view is determined and in response an optical occlusion system in the HMD is changed to allow more outside light to reveal the HMD user's eyes to the other users, The HMD optionally decreases the brightness of the virtual images presented in the HMD to allow the HMD user to improve his real world social and scene interaction.

21 Claims, 6 Drawing Sheets

SOCIAL AND SCENE TARGET AWARENESS AND ADAPTATION OF AN OCCLUSION SYSTEM FOR INCREASED SOCIAL AND SCENE INTERACTION IN AN OPTICAL SEE-THROUGH AUGMENTED REALITY HEAD MOUNTED DISPLAY

FIELD

The application relates generally to technically inventive, non-routine solutions that are necessarily rooted in computer technology and that produce concrete technical improvements.

BACKGROUND

Augmented reality (AR) head mounted displays (HMD) present images on a transparent or translucent display such that a wearer of the HMD can see both the real world through the display and the images on the display. It should be understood that such a display would include appropriate optical components to allow the user to focus on both the real world through the display and the virtual images presented on the display. It should be further understood that light from virtual images on such a display is typically optically combined with light from the real world. But such a system would only present virtual images as semi-transparent, unless an optical occlusion device is present. Such a device would attenuate the real-world light behind virtual images such that the virtual images are better reproduced (less semi-transparent, brighter and with more color consistency). In such a described system, as understood herein, HMD wearers using such device suffer from reduced social interaction because the wearer's eyes are masked from people in the real world by the virtual content being presented on the display. Additionally, the wearer's view of other people in the real world or of real world displays the wearer might want to see (such as a TV, a computer monitor or other computer-related device, a mobile telephone, a smart watch, etc.) can be blocked or diminished by the virtual images presented on the HMD display. It should be noted that a display can include elements for optically combining real world and virtual images from an imager, as well as the optical components required to variably attenuate real-world light passing through to the user's eyes.

SUMMARY

Accordingly, a system includes at least one augmented reality (AR) head-mounted display (HMD) that in turn includes at least one sensor such as a camera or microphone on the HMD for sensing real world objects including at least one person. At least one display is provided through which a wearer of the HMD can see real world objects. Also, the system includes at least one processor configured with instructions executable to present at least one image on the display and based at least in part on information from the sensor, to identify a display region through which the person can be seen. The instructions are executable to, responsive to identifying the region, decrease opacity of the region.

In some examples, the instructions may be executable to, responsive to identifying the region, decrease opacity of the region at least in part by altering an occlusion of the region to increase light propagating through the region. In other examples the instructions are executable to, responsive to identifying the region, decrease opacity of the region at least in part by removing from presentation in the region at least one image being presented in the region. In yet other examples the instructions can be executable to, responsive to identifying the region, decrease opacity of the region at least in part by decreasing a brightness of at least one image being presented in the region.

In non-limiting embodiments the instructions may be executable to identify that a wearer of the HMD is directing attention to the person, and responsive to identifying that the wearer of the HMD is directing attention to the person, decrease opacity of the region. In such examples, this may be done using an inward-looking camera and/or inward-oriented microphone.

In another aspect, a head-mounted display (HMD) includes at least one sensor generating signals representing at least one real world object external to the HMD, and at least one display assembly configured to present augmented reality images. The HMD also includes at least one processor configured with instructions to alter an opacity of the display assembly responsive to identifying the real-world object to permit viewing the real-world object through the display assembly.

In another aspect, a head-mounted display (HMD) includes at least one sensor generating signals representing a wearer of the HMD, and at least one display assembly configured to present augmented reality images. The HMD further includes at least one processor configured with instructions to alter an opacity of the display assembly responsive to identifying, based on signals from the sensor, that the wearer of the HMD is directing attention to a real-world object.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer simulation networks such as computer game networks as well as standalone computer simulation systems. A system herein may include server and client components, connected over a network such that data may be exchanged between the client and server components. The client components may include one or more computing devices including game consoles such as Sony PlayStation® or a game console made by Microsoft or Nintendo or other manufacturers of virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Figure 1:
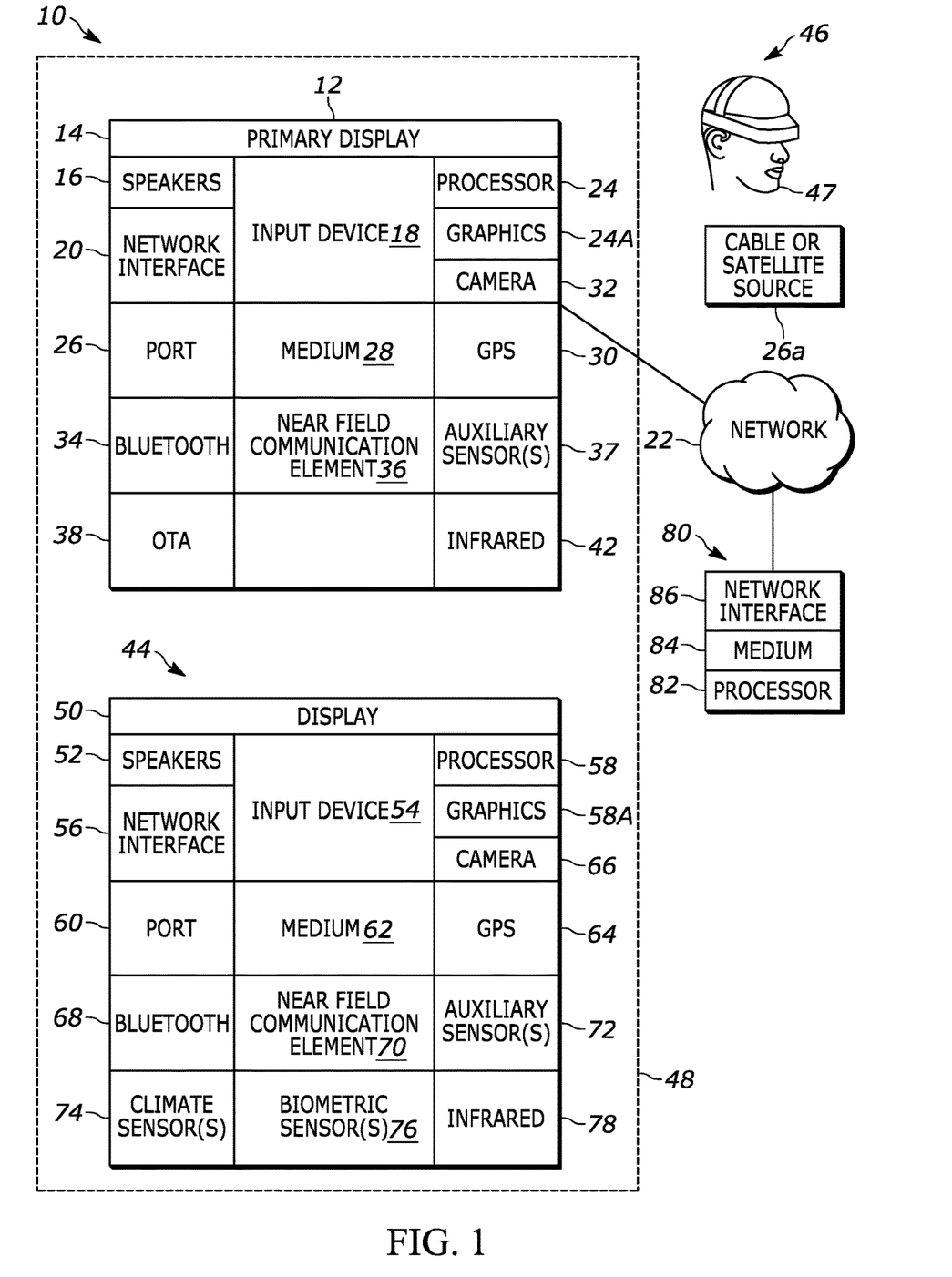
FIG. 1 is a block diagram of an example system including an example in accordance with present principles.

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as an AR headset worn by a player 47 as shown. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller, and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12 and/or a game console, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
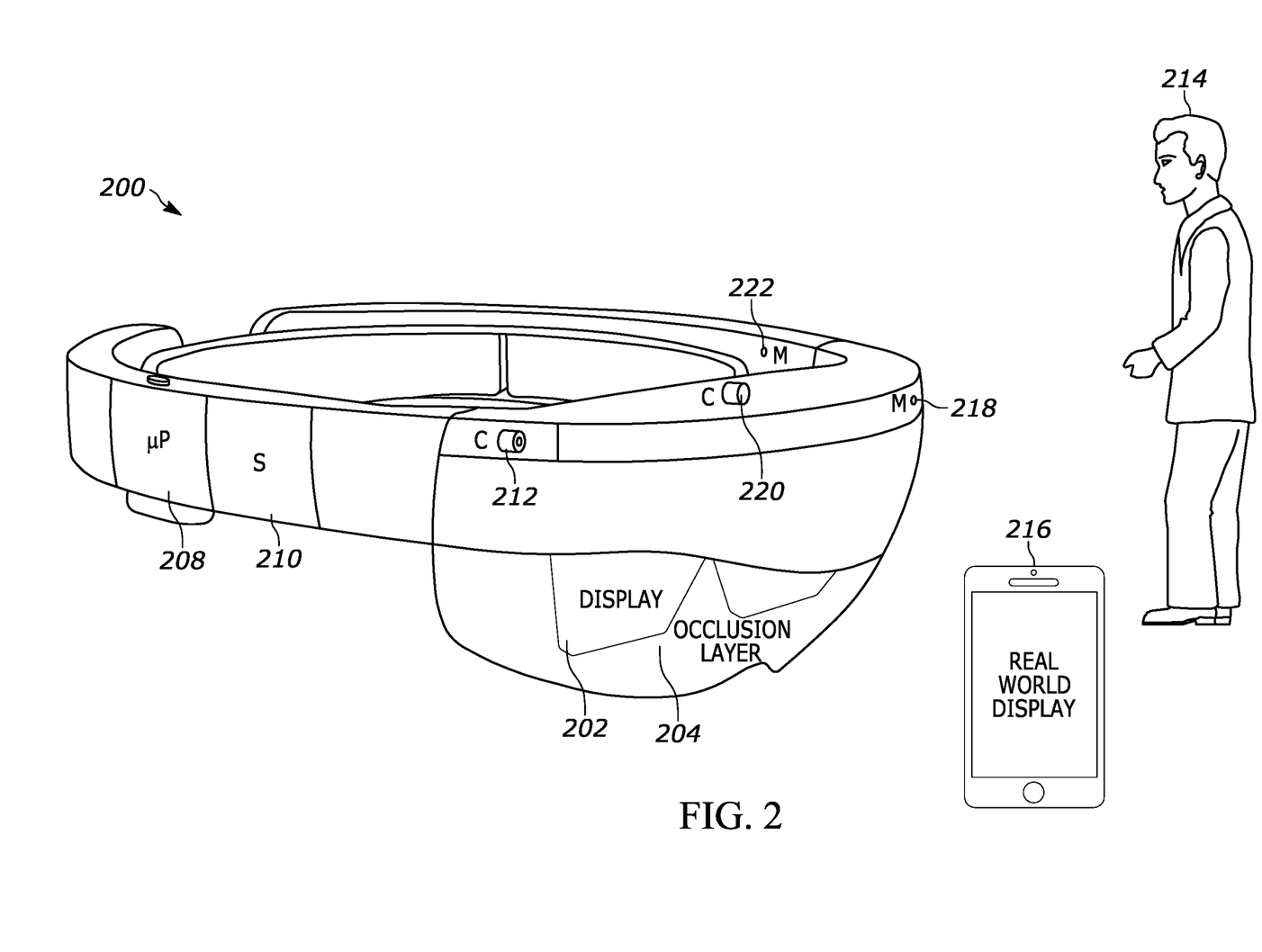
FIG. 2 is a schematic diagram of an augmented reality (AR) head-mounted device (HMD)

Now referring to FIG. 2, a head-mounted display (HMD) 200 is shown for presenting, in a display 202, augmented reality (AR) images that may be projected onto the display 202 combine with real world images passed through an occlusion layer 204. The HMD 200 may incorporate any of the above-described components of, e.g., the CE device 44 or 46 in addition to the components shown in FIG. 2.

The occlusion layer 204 may be, for example, variable-transparency glass, variable-transparency plastic, or other variable-transparency material and may be implemented by, for instance, electrochromic devices, suspended particle devices, or liquid crystal devices that vary their transparency based on control voltages applied. Note that the display 202 and occlusion layer 204 may be integrated into a single display.

The occlusion layer 204 may be controlled by one or more processors 208 accessing instructions on one or more computer storages 210 to present demanded AR images on the display 202 and to control the transparency of the occlusion layer 204 on a region-by-region basis. In other words, some regions of the layer 204 may be controlled to be more transparent than other regions.

At least one forward-looking camera, which may be a red-green-blue (RGB) camera, is mounted on the HMD 200 to generate images of objects in front of the HMD 200, such as a person 214 and a real world display 216 such as a TV, a mobile phone, a tablet computer, or other display apparatus. Image and/or audio recognition may be applied to the images by the processor 208 to detect that, for example, the person 214 is looking at and/or speaking to the wearer of the HMD 200. In one example, the camera 212 is registered with the HMD display coordinates, so that the location of the person 214 in the camera image can be mapped directly to the region of the display 202 the person can be seen through. For example, the field of view (FOV) of the camera 212 can be identical to the FOV of the wearer of the HMD 200 looking through the display. Other techniques for determining the region of the display 202 through which the person 214 may be seen can be used.

In addition, or alternatively, one or more microphones 218 may be mounted on the HMD 200 as shown to detect sound in front of the HMD 200. Plural microphones may be used so that the location from whence sound emanates can be triangulated, or a directional microphone may be used. In this way the processor 208 can identify the location of the person 214 relative to the region of the display the person 214 can be seen through.

Additionally, if desired one or more inward-looking cameras 220 and inward-oriented microphones 222 may be mounted on the HMD 200 for purposes to be shortly disclosed.

Figure 3:
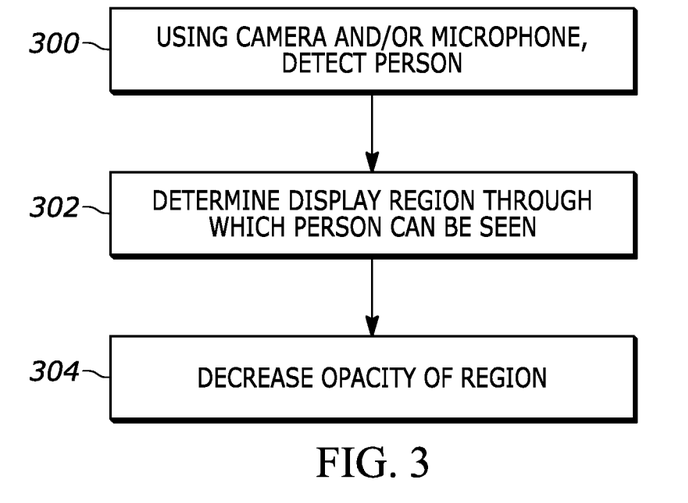
FIG. 3 is a flow chart of example overall logic.

FIG. 3 illustrates overall logic consistent with present principles. Commencing at block 300, using the outward-looking camera 212 and/or outward-oriented microphone 218, the person 214 is detected. Proceeding to block 302, the logic identifies or determines the location of the display 202 with occlusion region 204 through which the person 214 can be seen using, for example, the techniques described above. Moving to block 304, upon identification of the region of the social target, the opacity of the region is decreased, with the opacity of other regions of the display 202 with occlusion layer 204 remaining the same, so that the wearer of the HMD can more clearly see the person 214. The same principles apply to detecting the real-world display 216 or other real-world object to reduce the opacity of the region of the HMD display through which the object appears.

Figure 4:
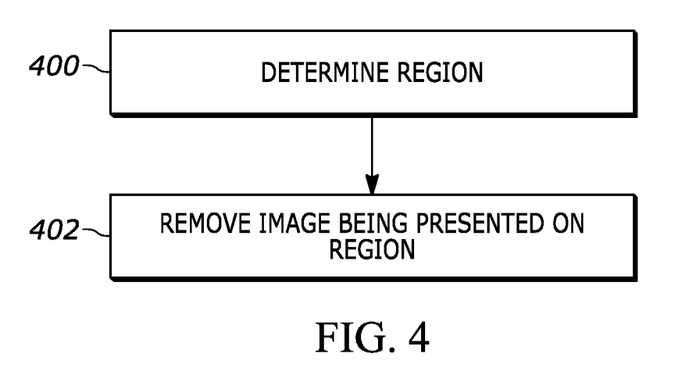
FIGS. 4-6 are flow charts of example logic for decreasing the opacity of the region of the HMD display through which a real-world object of interest such as a person can be seen.
Figure 5:
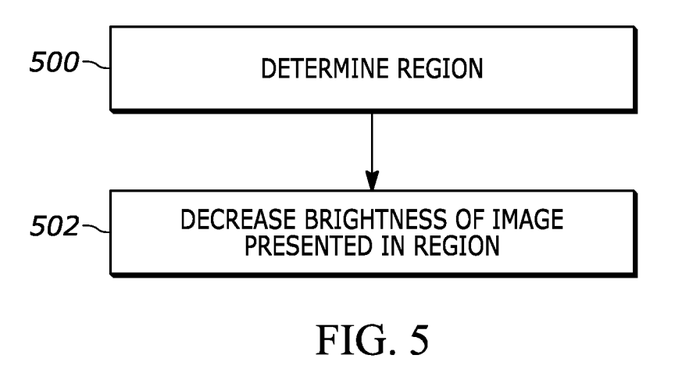
Figure 6:
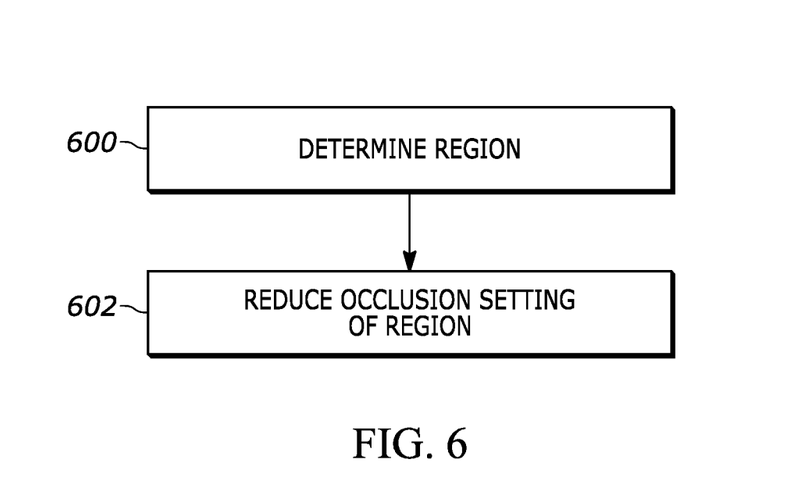

FIGS. 4-6 illustrate example techniques for decreasing the opacity of the region of the HMD display through which a real-world object can be seen. Combinations of the techniques in FIGS. 4-6 may be used.

Commencing at block 400 in FIG. 4, the region of the display through which the real-world object (e.g., the person 214) can be seen is identified as described above. Moving to block 402, any AR image being presented in the identified region ceases to be presented. AR images may continue to be presented in other regions of the HMD.

Commencing at block 500 in FIG. 5, the region of the display through which the real-world object (e.g., the person 214) can be seen is identified as described above. Moving to block 502, the brightness of any AR image being presented in the identified region is decreased, although the image itself can remain being presented in the region. The brightness of AR images being presented in other regions of the HMD may remain unchanged.

Yet again, commencing at block 600 in FIG. 6, the region of the display through which the real-world object (e.g., the person 214) can be seen is identified as described above. Moving to block 602, the opacity of the occlusion layer 204 in the region is reduced. The opacity of the occlusion layer 204 in other regions may remain unchanged.

Figure 7:
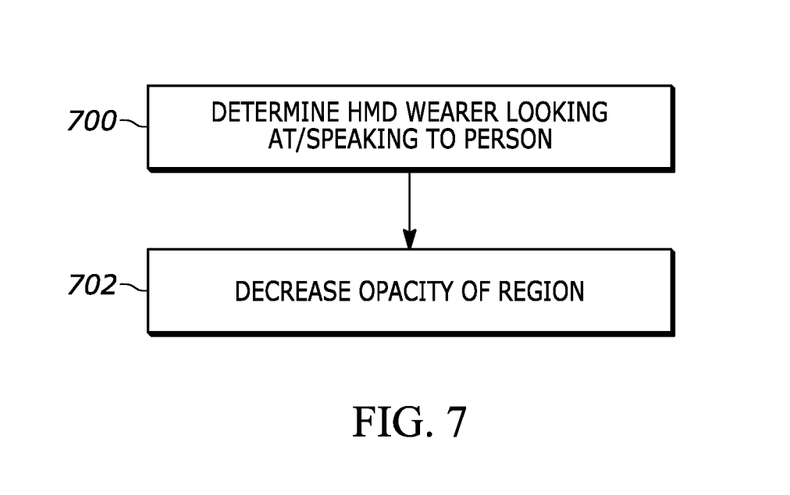
FIG. 7 is a flow chart of example logic illustrating decreasing the opacity of the region of the HMD display through which a real-world object of interest such as a person can be seen responsive to detecting an attention of the wearer of the HMD.

In addition to the above, signals from the inward-facing camera 220 and/or microphone 222 may be used by the processor 208 at block 700 of FIG. 7 to identify that the wearer of the HMD 200 looks and/or speaks in the direction of a real user's 214 head/face/eye region. Proceeding to block 702, in response to the identification at block 702 the occlusion system again increases the amount of real world light versus the amount of virtual image light using any of the techniques described herein to decrease the opacity of the HMD display, such that the wearer of the headset 200 can clearly see the person 214.

Moreover, as noted above the images from the outward-facing camera 212 and/or signals from the outward-oriented microphone 218 can be used to identify that the wearer of the HMD 200 is looking at real world display 216 or other important object for which the wearer of the HMD 200 requires full visual fidelity to discern. The HMD 200 reduces the opacity of the region of the display through which the object 216 is seen according to principles above.

The HMD 200 may reveal all the view of the real world or alternatively may just reveal only a small clear region around the social or scene targets, such that targets are visible within virtual images that AR HMD is presenting. The above system allows for more seamless social and scene interactions in an AR HMD system.

Figure 8:
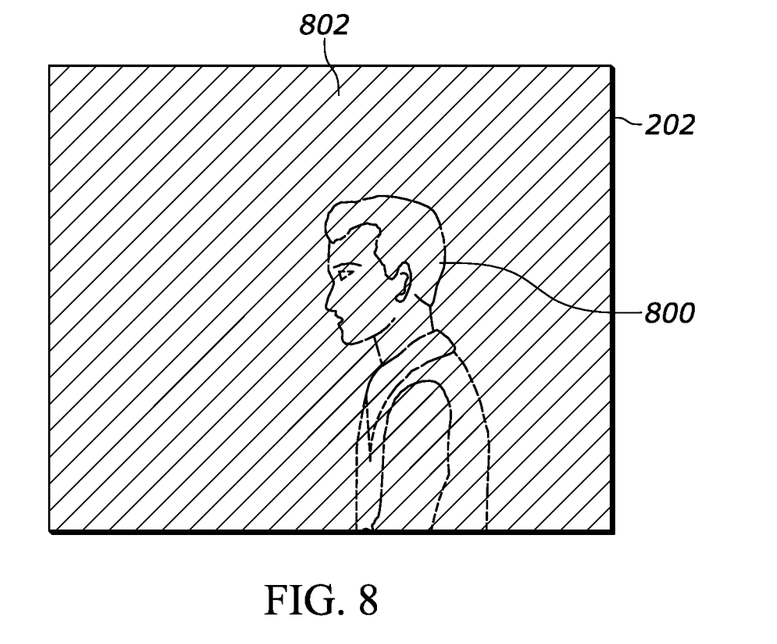
FIGS. 8 and 9 are screen shots of a display to schematically illustrate decreasing the opacity of a display to better show a real-world object.
Figure 9:
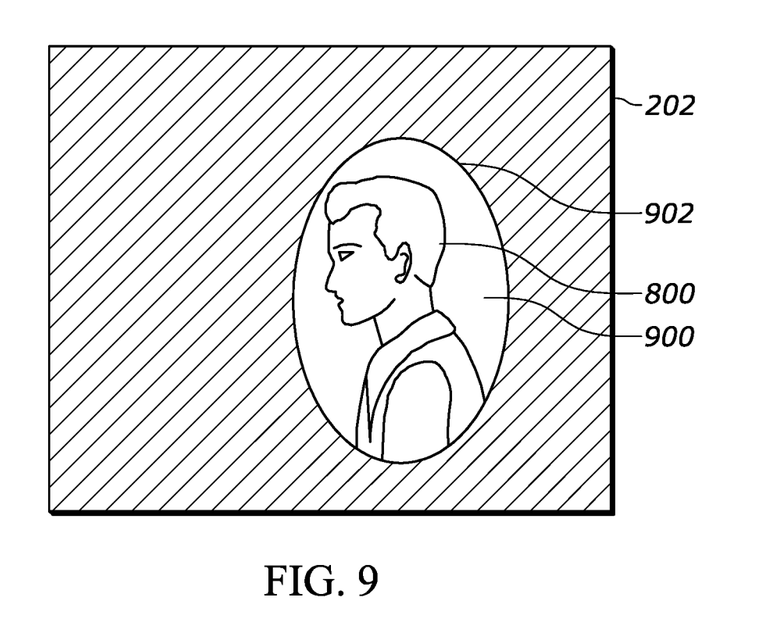

FIGS. 8 and 9 provide further illustration. FIG. 8 shows that absent present principles, a real world person 800 cannot be clearly seen through the display 202 as indicated by the person 800 being depicted in dashed lines, owing to an opaque background and/or VR objects being presented on the display 202 as represented for illustration purposes by cross-hatch lines 802. FIG. 9, however, illustrates that application of principles discussed above results in the opacity of the region 900 surrounding the person 800 being decreased such that the person 800 is clearly seen, as indicated by the person being represented by solid lines. If desired, a visibly highlighted boundary 902 may be included in the virtual images to surround the region 900 in which the person 800 appears to further bring the attention of the wearer of the HMD onto the person 800.

Figure 10:
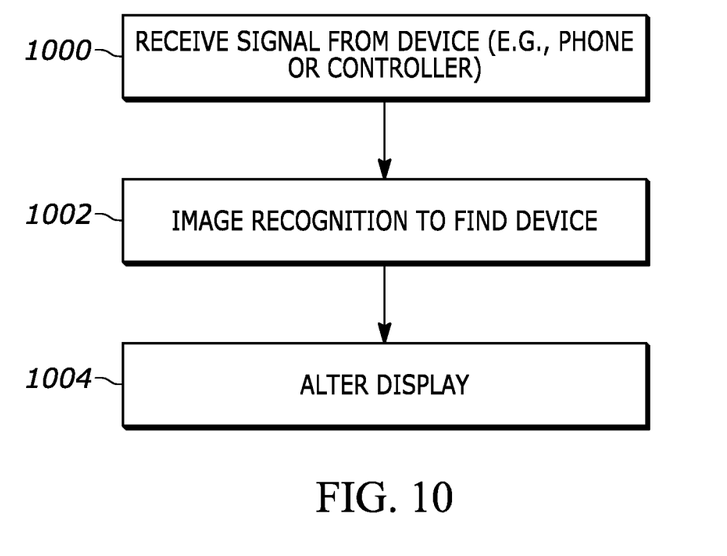
FIG. 10 is a flow chart of example logic of a use case.

FIG. 10 illustrates another example use case. At block 1000 a signal from a device such as a wireless phone or game controller may be received or detected by the HMD, e.g., a ring from a phone may be detected, or a beep indicating a text message, or a tactile signal from a controller may be detected by a haptic sensor. In response, the sensors on the HMD described above may be used to locate the device at block 1002, and then the opacity of the region of the display in which the device appears is decreased at block 1004 and the device, if desired, highlighted. Similarly, a keyword spoken by a person indicating, for example, the name of a device may be detected at block 1000, the device located at block 1002 and the display altered at block 1004.

Figure 11:
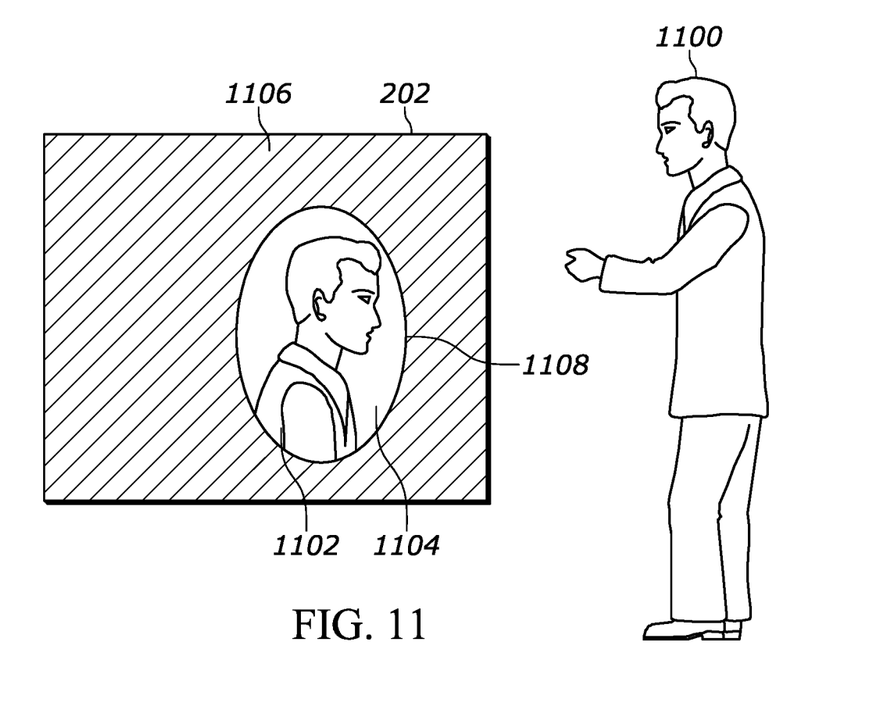
FIG. 11 is a screen shot of the display to illustrate yet another use case.

FIG. 11 illustrates yet another use case in which a real person 1100 is detected using image recognition to be pointing to another real-world person (or other object) 1102 who can be seen through the display 202. In response to detecting the pointing gesture, the opacity of the region 1104 surrounding the pointed-to person (or other object) 1102 is decreased as shown by the absence of cross-lines 1106 in the region 1104, and if desired a visible highlight line or boundary 1108 may be presented around the region 1104.

Information may be obtained from a phone or game controller to identify the attention of a user. In an environment with multiple users, one user can point to an object and this is detected and transferred to the HMDs of other users. If desired, regions pointed to can be highlighted to indicate awareness, fade out virtual image inside window. Also, keyword detection of terms such as "dual shock" can be used to reduce the opacity of a region of the display through which an object associated with the key word can be seen.

It will be appreciated that whilst present principals have been described with reference to some example embodiments, these are not intended to be limiting, and that various alternative arrangements may be used to implement the subject matter claimed herein.

What is claimed is:

1. A system comprising:
   at least one augmented reality (AR) head-mounted display (HMD) comprising:
   at least one sensor on the HMD for sensing real world objects;
   at least one display which can display virtual images and through which a wearer of the HMD can see real world objects; and
   at least one processor configured with instructions executable to:
   present at least one image on the display;
   based at least in part on information from the sensor, identify a display region through which the real world object can be seen; and
   responsive to identifying that the region is a region through which the real world object can be seen, decrease opacity of the region.

2. The system of claim 1, wherein the sensor comprises a camera.

3. The system of claim 1, wherein the sensor comprises a microphone.

4. The system of claim 1, wherein the system comprises at least one variable occluder to variably reduce light from real world objects and the instructions are executable to:
   responsive to identifying the region, decrease opacity of the region at least in part by altering an occlusion of the region using the variable occluder to increase light propagating through the region.

5. The system of claim 1, wherein the instructions are executable to:

responsive to identifying the region, decrease opacity of the region at least in part by removing from presentation in the region of at least one image being presented in the region.

6. The system of claim 1, wherein the instructions are executable to:
responsive to identifying the region, decrease opacity of the region at least in part by decreasing a brightness of at least one image being presented in the region.

7. The system of claim 1, wherein the instructions are executable to:
identify that a wearer of the HMD is directing attention to a person; and
responsive to identifying that the wearer of the HMD is directing attention to a person, decrease opacity of the region.

8. The system of claim 7, wherein the instructions are executable to identify that the wearer of the HMD is directing attention to a person at least in part based on a tracking the gaze of the HMD wearer.

9. The system of claim 7, wherein the instructions are executable to identify that the wearer of the HMD is directing attention to the person at least in part based on signals from at least one microphone.

10. The system of claim 1, wherein the real world object is sensed by sensing a ring from a phone or a beep indicating a text message or a tactile signal.

11. A head-mounted display (HMD) comprising:
at least one sensor generating signals representing at least one real world object external to the HMD;
at least one display assembly configured to present augmented reality images; and
at least one processor configured with instructions to alter an opacity of the display assembly responsive to identifying the real-world object to permit viewing the real-world object through the display assembly, wherein the opacity is altered by decreasing opacity of at least one virtual image at least in part by decreasing a brightness of the at least one virtual image.

12. The HMD of claim 11, wherein the object comprises a person.

13. The HMD of claim 11, wherein the object comprises a real-world display device.

14. The HMD of claim 11, wherein the instructions are executable to reduce an opacity only of a first region of the display assembly through which the real-world object can be seen and not reduce the opacity of regions other than the first region.

15. The HMD of claim 11, wherein the sensor comprises a camera or a microphone or a camera and a microphone.

16. The HMD of claim 11, wherein the instructions are executable to:
decrease opacity of the virtual images from the display assembly at least in part by altering an occlusion of the display assembly to increase real world light propagating through the display assembly.

17. The HMD of claim 11, wherein the instructions are executable to:
decrease opacity of the virtual images from the display assembly at least in part by removing from presentation in a region of the display assembly at least one virtual image being presented in the region.

18. A head-mounted display (HMD) comprising:
at least one sensor generating signals representing a wearer of the HMD;
at least one display assembly configured to present augmented reality images; and
at least one processor configured with instructions to alter an opacity of the display assembly responsive to identifying, based on signals from the sensor, that the wearer of the HMD is directing attention to a real-world object.

19. The HMD of claim 18, wherein the instructions are executable to identify that the wearer of the HMD is directing attention to the real-world object at least in part based on gaze tracking.

20. The HMD of claim 18, wherein the instructions are executable to identify that the wearer of the HMD is directing attention to the real-world object at least in part based on signals from at least one microphone.

21. The HMD of claim 18, wherein the instructions are executable to identify, based on signals from the sensor, that the wearer of the HMD is directing attention to the real-world object responsive to the signals from the sensor indicating a person pointing to the real-world object.

* * * * *